United States Patent
Cha et al.

(10) Patent No.: US 8,418,143 B2
(45) Date of Patent: *Apr. 9, 2013

(54) SOFTWARE RELIABILITY TEST METHOD USING SELECTIVE FAULT ACTIVATION, TEST AREA RESTRICTION METHOD, WORKLOAD GENERATION METHOD AND COMPUTING APPARATUS FOR TESTING SOFTWARE RELIABILITY USING THE SAME

(75) Inventors: Gyu Il Cha, Daejeon (KR); Young Ho Kim, Daejeon (KR); Sung In Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 699 days.

This patent is subject to a terminal disclaimer.

(21) Appl. No.: 12/572,939

(22) Filed: Oct. 2, 2009

(65) Prior Publication Data
US 2010/0287412 A1 Nov. 11, 2010

(30) Foreign Application Priority Data
May 8, 2009 (KR) .................. 10-2009-0040283

(51) Int. Cl.
*G06F 9/44* (2006.01)
*H04M 1/24* (2006.01)

(52) U.S. Cl.
USPC ...................... 717/124; 379/26.01

(58) Field of Classification Search .............. 717/124; 379/26.01
See application file for complete search history.

(56) References Cited

U.S. PATENT DOCUMENTS
2006/0126799 A1 * 6/2006 Burk .............. 379/26.01

FOREIGN PATENT DOCUMENTS
KR 1020080042659 A 5/2008

OTHER PUBLICATIONS

Kenichi Tanaka et al., "SCSI Fault Injection Test," Proceedings of the Linux Symposium, 2008, pp. 205-214, Ontario, Canada.

* cited by examiner

*Primary Examiner* — Hyun Nam

(57) ABSTRACT

Provided are a software reliability test method using selective fault activation, a test area restriction method, a workload generation method and a computing apparatus for testing software reliability using the same. The software reliability test method registers a test target module. The software reliability test method injects a fault into a fault injection target function when a caller of the fault injection target function is included in the registered module, in a case of calling the fault injection target function.

7 Claims, 4 Drawing Sheets

SOFTWARE RELIABILITY TEST METHOD USING SELECTIVE FAULT ACTIVATION, TEST AREA RESTRICTION METHOD, WORKLOAD GENERATION METHOD AND COMPUTING APPARATUS FOR TESTING SOFTWARE RELIABILITY USING THE SAME

CROSS-REFERENCE TO RELATED APPLICATIONS

This application claims priority under 35 U.S.C. §119 to Korean Patent Application No. 10-2007-0040283, filed on May 8, 2009, in the Korean Intellectual Property Office, the disclosure of which is incorporated herein by reference in its entirety.

TECHNICAL FIELD

The following disclosure relates to a software reliability test method using selective fault activation, a test area restriction method, a workload generation method and a computing apparatus for testing software reliability using the same, and in particular, to a software reliability test method using selective fault activation, a test area restriction method, a workload generation method and a computing apparatus for testing software reliability using the same, which select any one of execution modules that dynamically reside in an Operating System (OS) (for example, a kernel area) having the dynamic loading functions of the execution modules and are independent in function terms, and injects a fault only into the selected execution module to test reliability.

BACKGROUND

A software reliability test method using fault injection and workload generation has been used in the reliability test of various software, the availability test of a system or the benchmarking of a fault-tolerance system. This test method is also applied in the development of execution modules that are dynamically loaded, such as device driver.

A fault injection scheme for software reliability test can be divided into a compile-time fault injection scheme and a runtime fault injection scheme.

The compile-time fault injection scheme injects faults into the source code or assembly code of the target program. To inject faults, the program instruction must be modified before the program image is loaded and executed. The modified code alters the target program instructions, causing injection.

The runtime fault injection scheme dynamically changes a specific register value or the result value of a specific operation while a program is being executed, allowing a fault to be injected.

The compile-time fault injection scheme using the change of source codes allow a fault to be injected into a desired location, but it requires the change of source code, recompiling of changed source code, and execution of recompiled execution code. Moreover, when a user desires to change a fault injection location, the whole work process should be repeated.

On the contrary, the runtime fault injection scheme may freely inject a fault without the change of the source code or recompilation. However, it is difficult to dynamically change the result value of a corresponding function to inject a fault only for the test target when the modules of a system share a specific function. That is, this scheme is suitable for the test of the entire system, but there are some limitations when only the specific portion of the system is tested.

Such related art software reliability test method cannot inject a fault into the exact test area of a system specified by a user, but injects the fault into an entire system. Consequently, it is difficult to perform a detailed reliability test for each module of software. Moreover, it is difficult to generate intensive workload for the activation of an injected fault in consideration of the software operation characteristic of a test target.

SUMMARY

In one general aspect, a software reliability test method using selective fault activation includes: registering a test target module; and injecting a fault into a fault injection target function when a caller of the fault injection target function is included in the registered module, in a case of calling the fault injection target function.

In another general aspect, a test area restriction method includes: collecting effectiveness check information including an address of a memory in which a module registered as a test target among a plurality of modules sharing a specific function is executed; determining whether a caller of a fault injection target function included in the specific function is included in the registered module on the basis of the collected effectiveness check information; and injecting a fault into the fault injection target function, when the caller is included in the registered module.

In another general aspect, a workload generation method for testing software reliability includes: receiving workload information corresponding to a module which is registered as a test target among a plurality of modules sharing a specific function; and generating a workload in the registered module on the basis of the received workload information.

In another general aspect, a computing apparatus includes: a plurality of modules operating in a kernel; and a fault injection executor existing in the kernel, registering a designated module among the modules as a test target module, and injecting a fault into a fault injection target function when the fault injection target function is called by the registered module.

Other features and aspects will be apparent from the following detailed description, the drawings, and the claims.

DETAILED DESCRIPTION OF EMBODIMENTS

Figure 1:
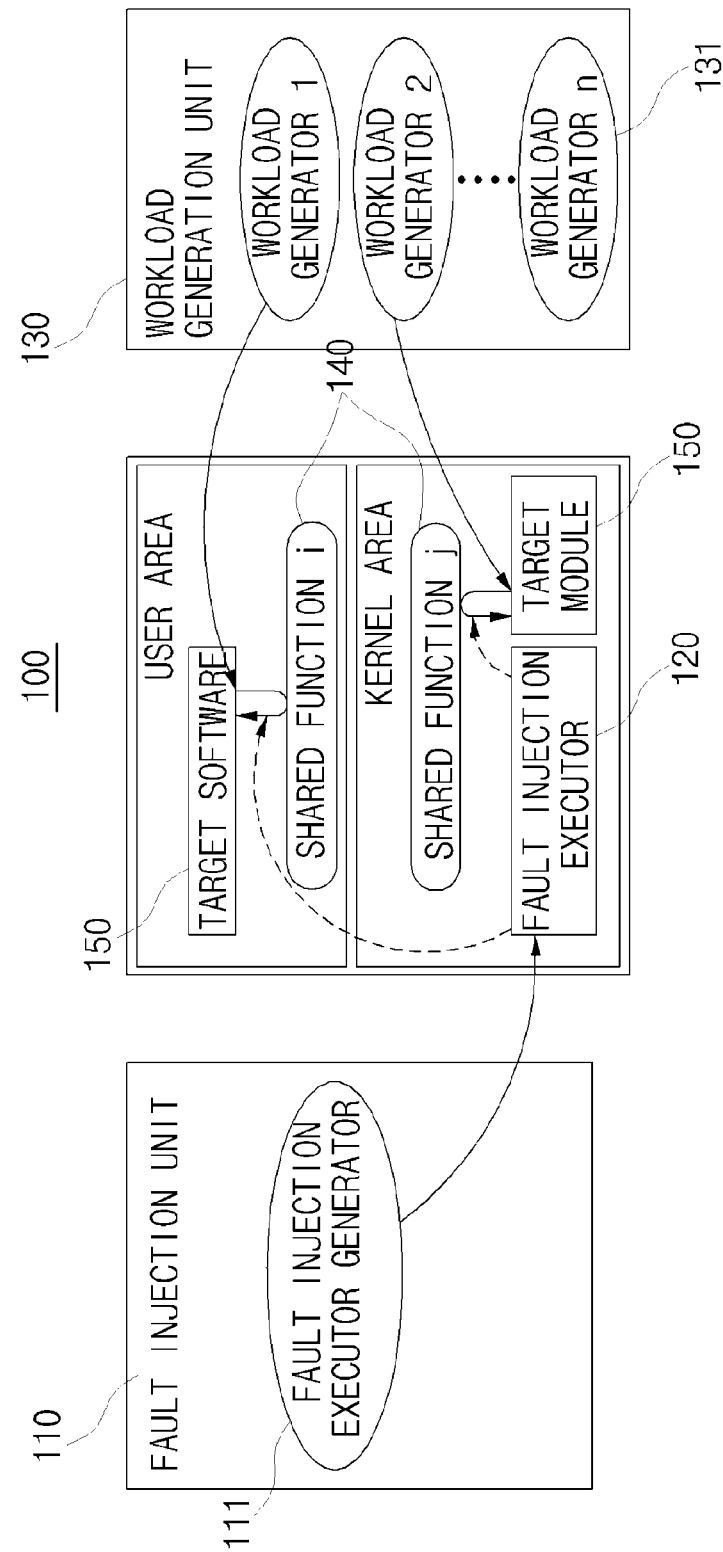
FIG. 1 is a block diagram illustrating a software reliability test system using selective fault activation according to an exemplary embodiment.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
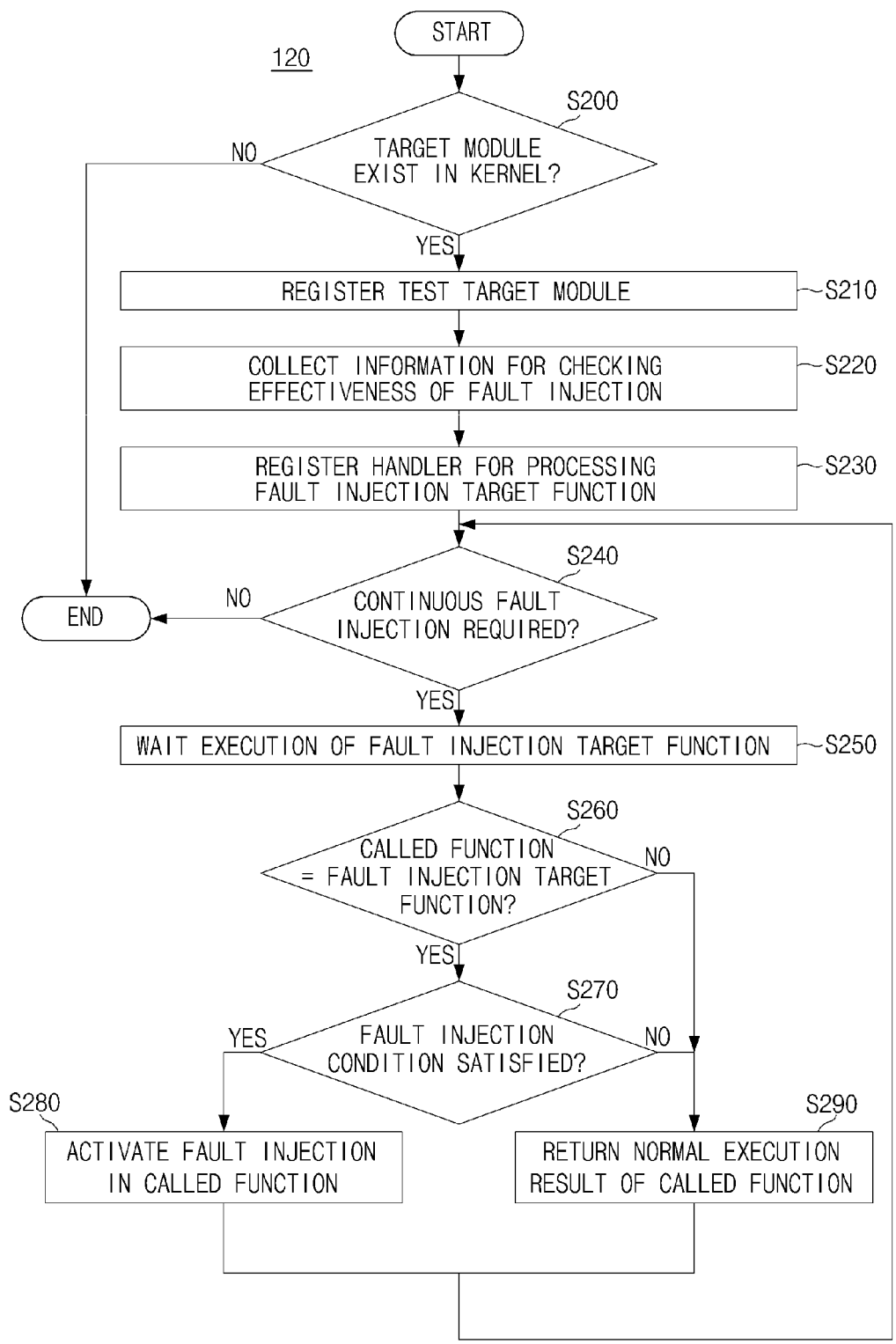
FIG. 2 is a flowchart illustrating a software reliability test method using selective fault activation according to an exemplary embodiment.

A software reliability test system and method using selective fault activation according to an exemplary embodiment will be described with reference to FIGS. 1 and 2. FIG. 1 is a block diagram illustrating a software reliability test system using selective fault activation according to an exemplary embodiment. FIG. 2 is a flowchart illustrating a software reliability test method using selective fault activation according to an exemplary embodiment.

Referring to FIG. 1, a software reliability test system 100 using selective fault activation according to an exemplary embodiment includes a fault injection unit 110, a fault injection executer 120, and a workload generation unit 130.

The fault injection unit 110 includes a fault injection executer generator 111, and receives information related to fault injection from a user.

The information related to fault injection may include modules that are designated as test targets, fault types to be generated in the designated modules, resident time limit of the fault injection executer 120 in a kernel, and the user designation activation pattern of fault injection.

The fault types to be generated in the designated module may include memory allocation and page allocation that are selected by a user. For example, when the user would like a fault to be generated in the memory allocation of the designated module, the user may select the memory allocation as the fault type to be generated in the designated module.

The user designation activation pattern of fault injection may include the number of fault injection for the selected fault type. The user may set the number of times a fault is injected when a memory is allocated. For example, the user may set a fault to be injected each time the memory allocation is performed, or the user may set a fault to be injected every five times the memory allocation is performed.

The fault injection executer generator 111 dynamically generates the source code of the fault injection executer 120 that may inject a fault of the fault type designated by the user into a designated module, compiles the generated source code into a dynamic loading kernel module, and loads the compiled code in a kernel.

For example, the fault injection unit 110 collects the function symbol information of a designated module, and the fault injection executor generator 111 transfers a fault injection location to the fault injection executor 120 on the basis of the collected symbol information. The collected symbol information may include symbols that are used in a designated target module 150, and address information corresponding to the symbols.

Functions 140 are used when coding a source code for a designated module, and addresses are respectively given to the used functions 140 when the used functions 140 are respectively converted into execution codes (for example, when the used functions are compiled). More specifically, when a memory allocation function and a disk access function are used in the source coding of the designated module, the fault injection unit 110 may collect the symbol information of a target module 150 because the converted execution code includes the address of the memory allocation function and the address of the disk access function. The fault injection executor generator 111 automatically generates an execution code in order for the fault injection executor 120 to register a fault injection processing handler for processing of a fault injection target function on the basis of the collected symbol information. Accordingly, an operation, checking whether a called function is the fault injection target function, is performed in the fault injection processing handler on the basis of the symbol information. Since this operation is merely a check operation, it may be omitted.

The fault injection unit 110 sets the resident time limit of the dynamically-loaded fault injection executor 120 in a kernel, and checks whether the resident time exceeds the resident time limit.

When the resident time of the fault injection executor 120 exceeds the resident time limit in the kernel, the fault injection unit 110 terminates the fault injection executor 120 that is operating in the kernel. Herein, the resident time limit in the kernel may basically be the maximum time limit of a reliability test for a designated module, and may also be the time limit for preventing the fault injection executor 120 from limitlessly operating (for example, that in which a test gets into an infinite loop).

The fault injection unit 110 may autonomously determine a resident time in the kernel when the resident time limit of the fault injection executor 120 in the kernel is not provided from a user.

The fault injection executor 120 receives information of a module that is designated as a test target, from the fault injection unit 110. The fault injection executor 120 registers the information of the module, designated as the test target, in its own state variable on the basis of the received information.

The fault injection executor 120 collects effectiveness check information from the kernel for checking whether it is required to activate the fault injection of a registered module. Herein, the effectiveness check information is the address of a memory in which a module designated as a test target is executed.

The fault injection executor 120 registers a fault injection processing handler that processes the activation of selective fault injection. For example, the fault injection executor 120, which is dynamically loaded in the kernel, may register the fault injection processing handler for injecting a fault into a function (for example, malloc) of performing an operation (for example, memory allocation) that is selected as a fault type by a user on the basis of fault types included in fault injection-related information.

When the above-described operations are completed, the fault injection executor 120 is changed into a fault injection standby state.

The workload generation unit 130 receives workload generation information that is analyzed on the basis of a fault type and a designated module from the fault injection unit 110, and generates a workload efficiently and intensively.

When a designated module reaches a fault injection point according to a workload generated by the workload generation unit 130, i.e., a fault injection target function among functions shared by a plurality of modules is executed to reach a fault injection location that is predetermined in a called function, the fault injection executor 120 that is in the fault injection standby state is changed into a fault injection operation state.

The operation of the fault injection executor 120 and a software reliability test method will be described below in more detail with reference to FIG. 2.

Referring to FIG. 2, the fault injection executor 120 registers a module designated by a user as a test target on the basis of information that is transferred from the user, among a plurality of modules sharing a specific function in operation S210.

The fault injection executor 120 checks whether a designated module exists in a kernel, before registering the designated module as a test target in operation S200.

When the designated module does not exist in the kernel, the fault injection executor 120 ends a software reliability test.

After the registration of the test target module 150 in operation S210, the fault injection executor 120 collects effectiveness check information for checking whether it is required to activate the selective fault injection for the registered target module 150 in operation S220. When the test target is a kernel module, the effectiveness check information may be basically collected on the basis of module state information in the kernel. When a shared function 140 for fault injection is called in a system, it may be used as information for checking whether the activation of fault injection is required in operation S270.

The fault injection executor 120 collects information for the effectiveness check of a target module 150, and when a fault injection target function among specific functions shared by the plurality of modules is called, the fault injection executor 120 registers a fault injection processing handler for executing fault injection in operation S230. Herein, the register location of the fault injection processing handler may be set on the basis of information that is analyzed in association with a fault type by the fault injection unit 110.

When the registration of the fault injection processing handler for processing the fault injection target function is completed, the fault injection unit 110 determines whether fault injection should be continuously performed through the fault injection executor 120 in operation S240. This determination is based on the predetermined resident time limit of the fault injection executor 120 in the kernel. For example, when the resident time exceeds the resident time limit, the fault injection unit 110 may terminates the fault injection executor 120 that is operating in the kernel.

However, when the resident time does not exceed the resident time limit, the fault injection executor 120 changes into a standby state in which fault injection may be performed in operation S250. When a workload is generated in a module that is registered as a test target by the workload generation unit 130 and thereby a shared function is called, the fault injection executor 120 changes into a fault injection operation state. A detailed description associated with the workload generation of the workload generation unit 130 will be described with reference to FIG. 4.

The fault injection executor 120 that is in the changed fault injection operation state determines whether the shared function 140 is a fault injection target function in operation S260.

For example, when the called shared function 140 is a memory allocation function and the memory allocation function is the fault injection target function, the fault injection processing handler of the fault injection executor 120 may determine whether to activate fault injection based on information of a caller that calls the memory allocation function because the memory allocation function may be called by other modules existing on the kernel as well as a module registered as a test target.

When the called shared function 140 is the fault injection target function, determination of whether to actually inject a fault is performed through an operation S270 of checking the fault injection effectiveness of a target module 150 in the fault injection processing handler. An operation of injecting a fault into a test target module 150 will be described in detail with reference to FIG. 3, and is described in brief here.

When the caller of the function is included in the module registered as the test target in operation S260, the fault injection processing handler of the fault injection executor 120 checks whether it satisfies the fault injection condition set by a user in operation S270, and injects a fault into fault injection location in operation S280. The fault injection processing handler of the fault injection executor 120 returns a fault value instead of a normal result value based on the execution of the called function.

The fault injection condition for controlling the fault injection pattern in detail may include fault injection intervals, a fault injection maximum frequency and flags. For example, in a case where fault injection condition is set to inject a fault when a memory allocation flag is set as 1, although the memory allocation function is set as the fault injection target function, the fault is not injected when a memory allocation flag is not 1.

However, when the caller of the function is not included in the designated module in operation S260, the fault injection processing handler of the fault injection executor 120 returns the normal result value of the called function in operation S290.

In this way, the software reliability test may be performed in detail by injecting the fault into the selected location of the designated module.

Figure 3:
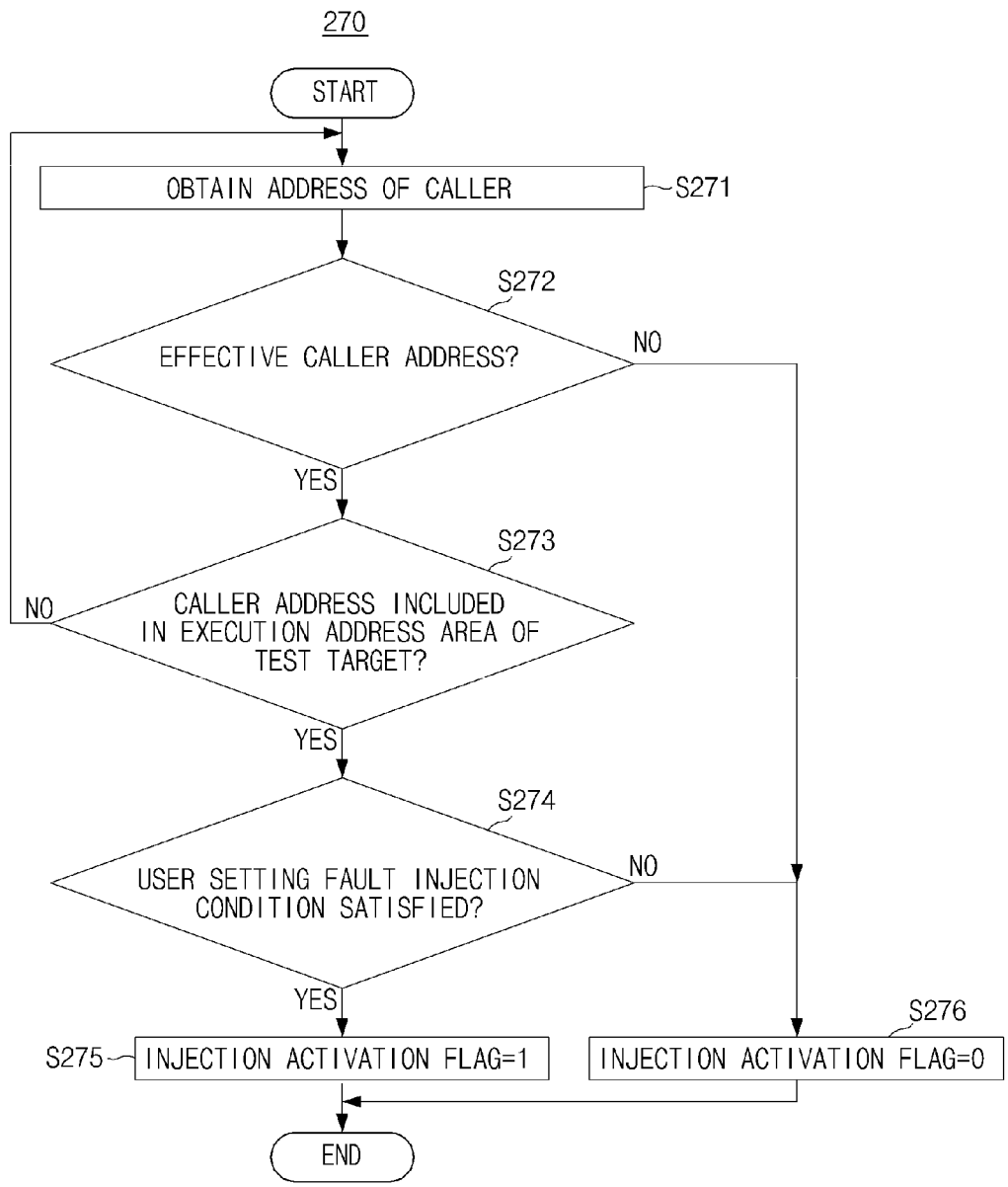
FIG. 3 is a flowchart illustrating a test area restriction method for a software reliability test according to an exemplary embodiment.

The following description will be made in detail with reference to FIG. 3 on a method for checking whether a fault injection condition is satisfied in a test target module 150 for a software reliability test according to an exemplary embodiment. FIG. 3 is a flowchart illustrating a test area restriction method for a software reliability test according to an exemplary embodiment.

Referring to FIG. 3, the fault injection processing handler of the fault injection executor 120 obtains the address of a caller in operation S271.

A function call mechanism is based on a stack. A system maintains a stack per software, and maintains a buffer (for example, a stack frame) corresponding to a function. Whenever the function is called, the address of the caller is stored in the buffer. That is, the system may store the address of a caller function in a buffer corresponding to the called function.

Accordingly, the fault injection processing handler may trace a value, which is stored in a buffer corresponding to a called function, to obtain the caller address.

The fault injection processing handler of the fault injection executor 120 checks the effectiveness of the caller address in operation S272. Herein, the effectiveness check is for checking whether the caller address is stored in the buffer of the called function. When the caller address is not effective (for example, when there are no more caller addresses to be checked), an operation of checking effectiveness designates a fault injection activation flag as 0 and is ended in operation S276. When the flag is 0, the fault injection processing handler does not inject a fault into a fault injection target function.

When the caller address is effective, the fault injection processing handler of the fault injection executor 120 determines whether the caller address is included in the execution address of a module registered as a test target, i.e., the address of a memory in which the module registered as the test target is executed, on the basis of the effectiveness check information of the module registered as the test target in operation S273.

When the caller address is not included in the execution address of the module registered as the test target in operation S273, the fault injection processing handler of the fault injection executor 120 returns to operation S271 of obtaining the fore caller address. This return operation is repeated until a caller address is not effective or the caller address is included in the execution address of a test target module 150.

When the caller address is included in the execution address of the test target module 150 in operation S273, the fault injection processing handler of the fault injection executor 120 checks whether the fault injection condition set by a user is satisfied in operation S274.

When the fault injection condition is not satisfied in operation S274, the fault injection processing handler of the fault injection executor 120 designates a fault injection activation flag as 0 based on the result value of the effectiveness check and is ended in operation S276.

However, when the fault injection condition is completely satisfied, the fault injection processing handler of the fault injection executor 120 designates a fault injection activation flag as 1 based on the result value of the effectiveness check and is ended in operation S275. When the flag is 1, the fault injection processing handler injects a fault into the fault injection target function.

As described above, the fault injection executor 120 may inject a fault only into the location of a module that is selected as a test target among a plurality of modules sharing a specific function. Accordingly, it prevents the fault from being injected into an undesired location (for example, another module instead of a designated module), and the software reliability test is performed in a selected location efficiently.

Figure 4:
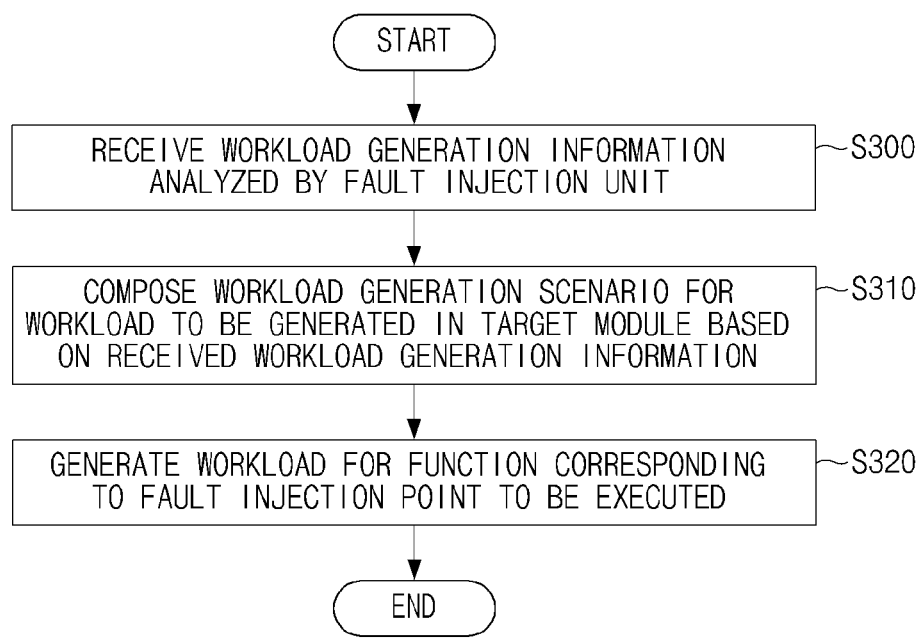
FIG. 4 is a flowchart illustrating a workload generation method in a test target module for a software reliability test according to an exemplary embodiment.

A workload generation method for a software reliability test will be described with reference to FIG. 4. FIG. 4 is a flowchart illustrating a workload generation method in a test target module 150 for a software reliability test according to an exemplary embodiment.

Referring to FIG. 4, the workload generation unit 130 receives workload generation information that is analyzed on the basis of a fault type and a designated module in operation S300.

For example, the workload generation unit 130 may receive the workload generation information inputted from a user, through the fault injection unit 110, or may directly receive workload generation information from the user.

Herein, the workload generation information may include a designated module and its fault injection location information.

The workload generation unit 130 generates a workload in a target module 150 based on the received workload generation information.

For example, the workload generation unit 130 composes a workload generation scenario for a workload to be generated on the basis of the workload generation information in operation S310. In the composed workload generation scenario, the workload may be intensively generated in order for a function corresponding to a fault injection location to be executed in operation S320.

Herein, the workload generation is for executing a function (for example, a fault injection target function) corresponding to the fault injection location of a target module 150 through the operation of the a designated module, and the workload generation unit 130 may replace the role of an application program in a scheme similar to a scheme of requesting the performance of a function to a target module 150 in the application program.

Intensive workload generation may increase the frequency of requesting the execution of the function to the target module 150 than the frequency of requesting under a normal operation instead of a software test. For example, if the request is performed once under the normal operation, the request may be performed a hundred times under the intensive workload generation.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A software reliability test method using selective fault activation, the method comprising:
    registering a test target module; and
    injecting a fault into a fault injection target function when (i) a caller of the fault injection target function is comprised in the registered module and (ii) a given fault injection condition is satisfied,
    wherein the injecting of a fault comprises:
        collecting effectiveness check information comprising an address of a memory in which the registered module is executed;
        determining whether the caller of the fault injection target function is comprised in the registered module on the basis the collected effectiveness check information; and
        injecting the fault into the fault injection target function when the caller is comprised in the registered module,
    wherein the step of determining comprises:
        determining whether an address of the caller is comprised in the address of the memory in which the registered module is executed; and
        determining that the caller is comprised in the registered module, when the address of the caller is comprised in the address of the memory.

2. The software reliability test method of claim 1, further comprising:
    registering a fault injection processing handler for processing the fault injection target function,
    wherein the injecting of the fault comprises injecting the fault into the fault injection target function through the fault injection processing handler.

3. The software reliability test method of claim 1, the method further comprising:
    generating a workload for the registered module to call the fault injection target function,
    wherein the injecting of the fault comprises injecting the fault into the fault injection target function according to the generated workload.

4. A test area restriction method, comprising:
    collecting effectiveness check information comprising an address of a memory in which a module, registered as a test target among a plurality of modules sharing a specific function, is executed;
    determining whether a caller of a fault injection target function, comprised in the specific function, is comprised in the registered module on the basis of the collected effectiveness check information; and injecting a fault into the fault injection target function when (i) the caller is comprised in the registered module and (ii) the effectiveness check information satisfies a given fault injection condition, wherein the determining comprises:
- determining whether a caller address of the fault injection target function is comprised in the address of the memory in which the registered module is executed; and
- determining that the caller is comprised in the registered module, when the caller address is comprised in the address of the memory.

5. A computing apparatus, comprising:

a plurality of modules operating in a kernel; and a fault injection executor existing in the kernel, wherein the fault injection executor is configured to register a designated module among the modules as a test target module, and further configured to inject a fault into a fault injection target function when (i) the fault injection target function is called by the registered module and (ii) a given fault injection condition is satisfied, wherein the fault injection executor collects effectiveness check information comprising an address area of a memory in which the registered module is executed, wherein the fault injection executor determines whether a caller of the fault injection target function is comprised in the registered module on the basis of the collected effectiveness check information, and injects a fault into the called fault injection target function when the caller is comprised in the registered module, and wherein the fault injection executor determines whether an address of the caller is comprised in the address of the memory in which the registered module is executed, and injects a fault into the called fault injection target function when the address of the caller is comprised in the address of the memory.

6. The computing apparatus of claim 5, wherein the fault injection executor registers a fault injection processing handler in the fault injection target function, and injects a fault into the fault injection target function through the fault injection processing handler.

7. The computing apparatus of claim 5, further comprising:

a workload generating unit generating a workload for the registered module to call the fault injection target function of a specific function, wherein the fault injection executor injects the fault into the called fault injection target function according to the generated workload.

* * * * *